(12) United States Patent
Hsu

(10) Patent No.: US 8,191,964 B2
(45) Date of Patent: Jun. 5, 2012

(54) ADJUSTMENT DEVICE FOR BICYCLE SEAT

(76) Inventor: Jung Yu Hsu, Tainan (TW)

( * ) Notice: Subject to any disclaimer, the term of this patent is extended or adjusted under 35 U.S.C. 154(b) by 456 days.

(21) Appl. No.: 12/585,163

(22) Filed: Sep. 8, 2009

(65) Prior Publication Data

US 2010/0308628 A1 Dec. 9, 2010

(30) Foreign Application Priority Data

Jun. 5, 2009 (TW) .............................. 98209833 U

(51) Int. Cl.
*B62J 1/08* (2006.01)
*B62J 1/10* (2006.01)
(52) U.S. Cl. ............ 297/215.13; 297/344.19; 280/288.4
(58) Field of Classification Search ............. 297/215.14, 297/215.13, 215.15, 344.18, 344.19, 344.2; 280/288.4
See application file for complete search history.

(56) References Cited

U.S. PATENT DOCUMENTS 4,592,590 A * 6/1986 Slaats et al. .............. 297/344.19
4,593,951 A * 6/1986 Slaats et al. .............. 297/344.19
4,621,868 A * 11/1986 Slaats et al. .............. 297/344.19
5,826,935 A * 10/1998 DeFreitas ................ 297/215.13
7,673,936 B2 * 3/2010 Hsu .......................... 297/215.13

* cited by examiner

*Primary Examiner* — Paul N Dickson
*Assistant Examiner* — Wesley Potter
(74) *Attorney, Agent, or Firm* — Rosenberg, Klein & Lee

(57) ABSTRACT

An adjustment device for bicycle seat includes a connection portion located close to a top of the seat post and at least one through hole is defined through a wall of the connection portion. An adjustment device is located between the seat connector and the seat post so as to adjust the seat post relative to the seat tube. The adjustment device includes an adjustment path which can communicate with the at least one through hole or be sealed from the at least one through hole. A balance unit is connected to the connection portion and includes a cylinder and a piston ring is movably received in the cylinder to define an inner space of the cylinder into a liquid space and an air space. The cylinder includes a supply path which communicates with the liquid space and the at least one through hole.

12 Claims, 17 Drawing Sheets

ADJUSTMENT DEVICE FOR BICYCLE SEAT

FIELD OF THE INVENTION

The present invention relates to an adjustment device, and more particularly, to an adjustment device for adjustment of height of bicycle seat by the use of hydraulic power.

BACKGROUND OF THE INVENTION

A bicycle includes a seat post which is connected with a seat on a top end thereof and the seat post is inserted into the seat tube of the bicycle frame. The seat post can be adjusted along longitudinal axis of the seat tube to set the seat at desired height to meet needs of different users. The adjustment for the seat can be made in two different ways, one of which is to adjust the inclination of the seat relative to the horizontal plane and the other is to adjust the height of the seat relative to the ground. The present invention is developed to the adjustment device for adjustment the height of the bicycle seat.

The conventional methods for adjustment of the seat can be made by mechanical method and by hydraulic method. The mechanical method includes a lever which controls a control unit and the seat post can be adjusted relative to the seat tube by operation of the control unit.

The hydraulic method includes an adjustment unit which includes an adjustment member which is connected to the top end of the seat tube and has an adjustment tube which is connected to the seat tube so as to form an inner space and an outer space between the seat tube and the adjustment member. A path is defined between the adjustment member and the adjustment tube so as to communicate with the inner and outer spaces. An adjustment valve rod movably extends through the path so as to open or close the passages of the adjustment unit. By operation of the adjustment valve rod, the seat post can be set to a desired height.

However, the mechanical method can only provide two-position adjustment to the seat and this may not able to meet requirements for different users. The hydraulic method can set the seat at different heights by adjust the hydraulic fluid between the inner and outer spaces. However, the seat tube and the seat post both require a larger space to accommodate the inner and outer spaces, and the air room and fluid room. The wider and larger seat post and seat tube make the bicycle to be bulky and heavy.

The present invention intends to provide a seat adjustment device which includes a balance unit which is mounted to the seat post and the balance unit provide the device necessary space for the hydraulic fluid and air so that the sizes of the seat post and seat tube do not change.

SUMMARY OF THE INVENTION

The present invention relates to an adjustment device for bicycle seat and the adjustment device comprises a seat tube and a seat post is movably inserted into the seat tube. The seat post includes a connection portion located close to a top of the seat post and at least one through hole is defined through a wall of the connection portion. A seat connector is connected to the top of the seat post to be connected with a seat. An adjustment device is located between the seat connector and the seat post so as to control movement between the seat post relative to the seat tube. The adjustment device includes an adjustment path which is controlled to be in communication with the at least one through hole or to be isolated from the at least one through hole. A balance unit is connected to the connection portion and includes a cylinder with a piston ring movably received therein which defines an inner space of the cylinder into a liquid space and an air space. The cylinder includes a supply path which communicates with the liquid space and the at least one through hole.

The primary object of the present invention is to provide an adjustment device which includes an exterior balance unit which provides spaces for hydraulic liquid and air so that the size for the seat tube and seat post can be maintained the same.

Another object of the present invention is to provide an adjustment device which can adjust the seat post with longer travel distance when compared with the conventional adjustment device.

Yet another object of the present invention is to provide an adjustment device which can adjust the seat to any desired position to meet requirements of different users.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
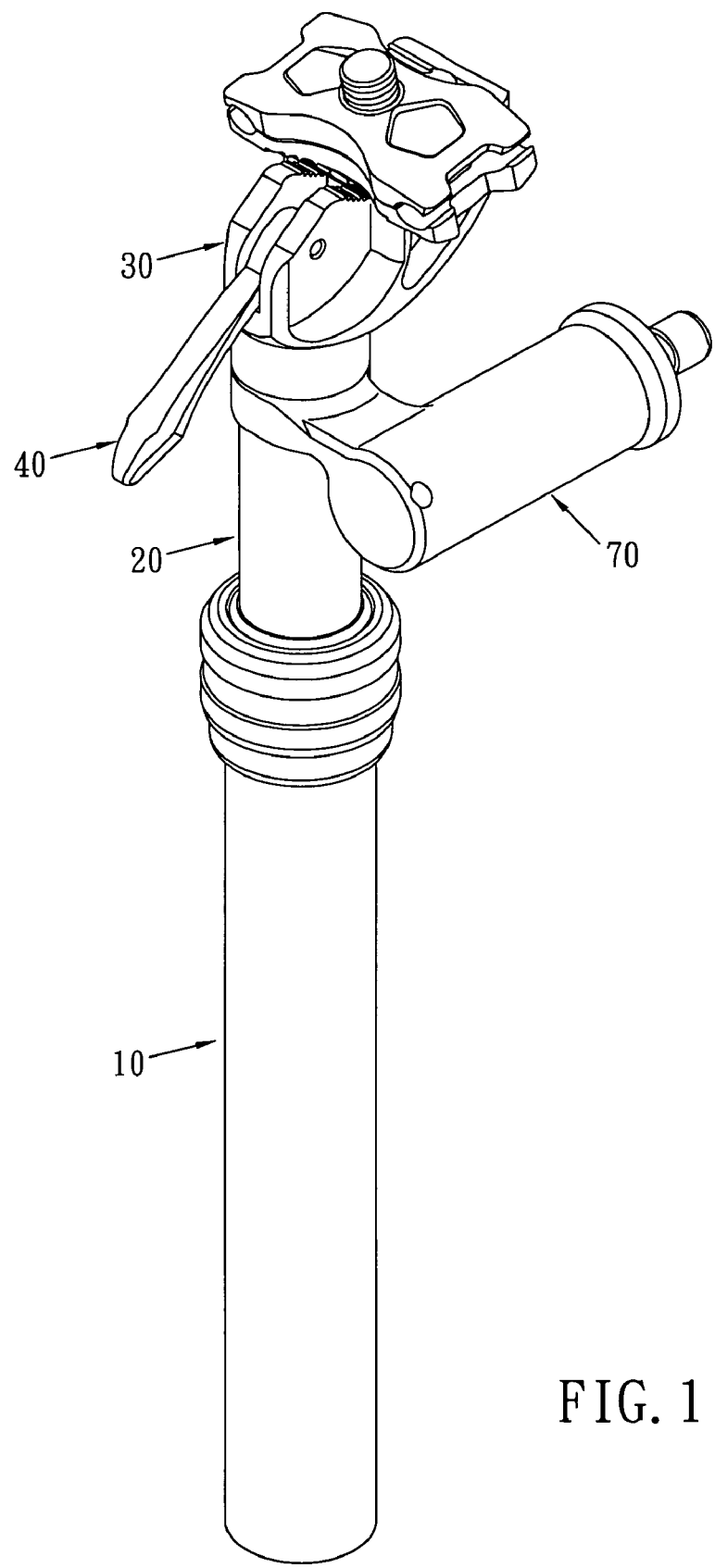
FIG. 1 is a perspective view to show the adjustment device on the seat tube of the present invention.
Figure 2:
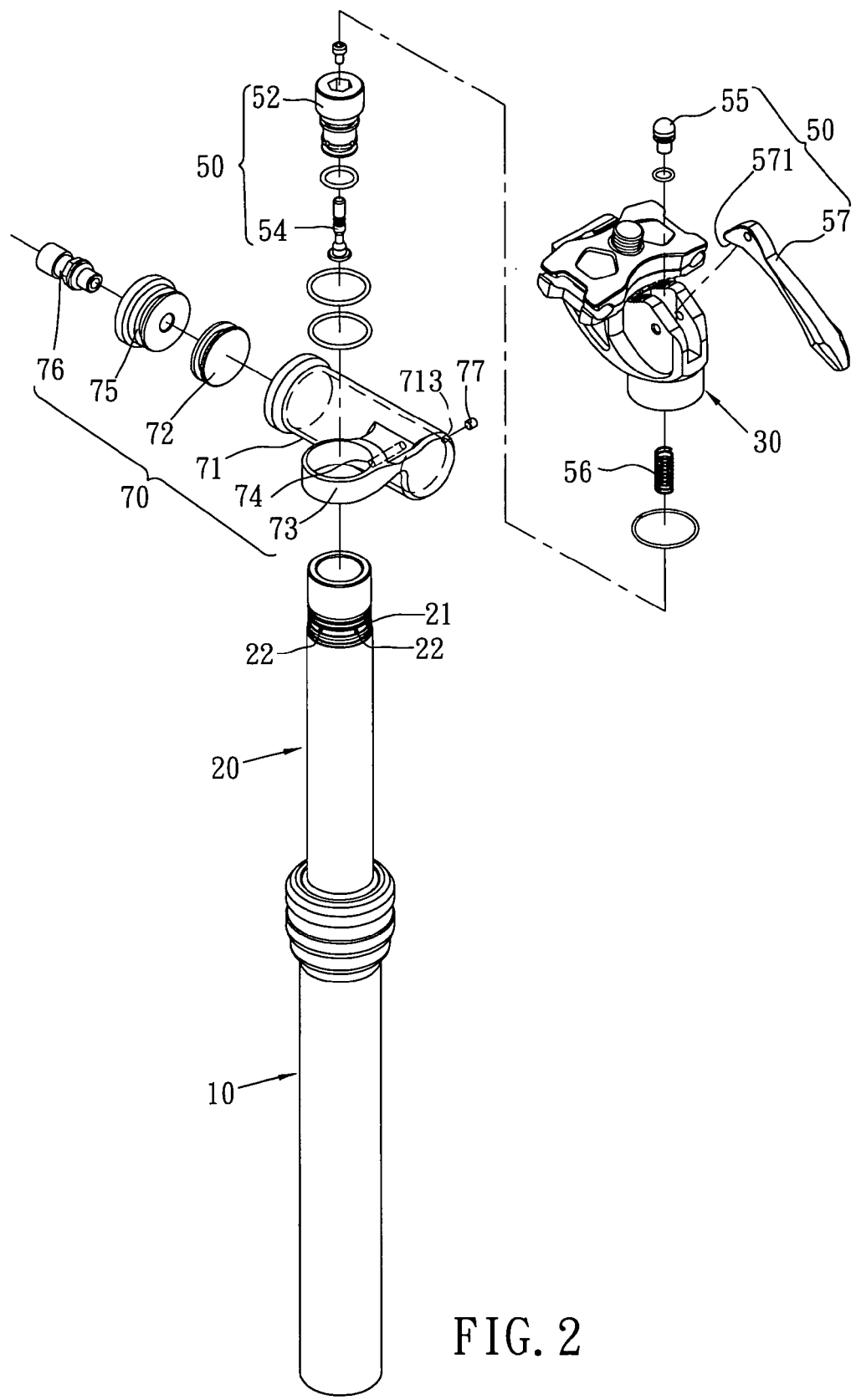
FIG. 2 is an exploded view to show the adjustment device of the present invention.
Figure 3:
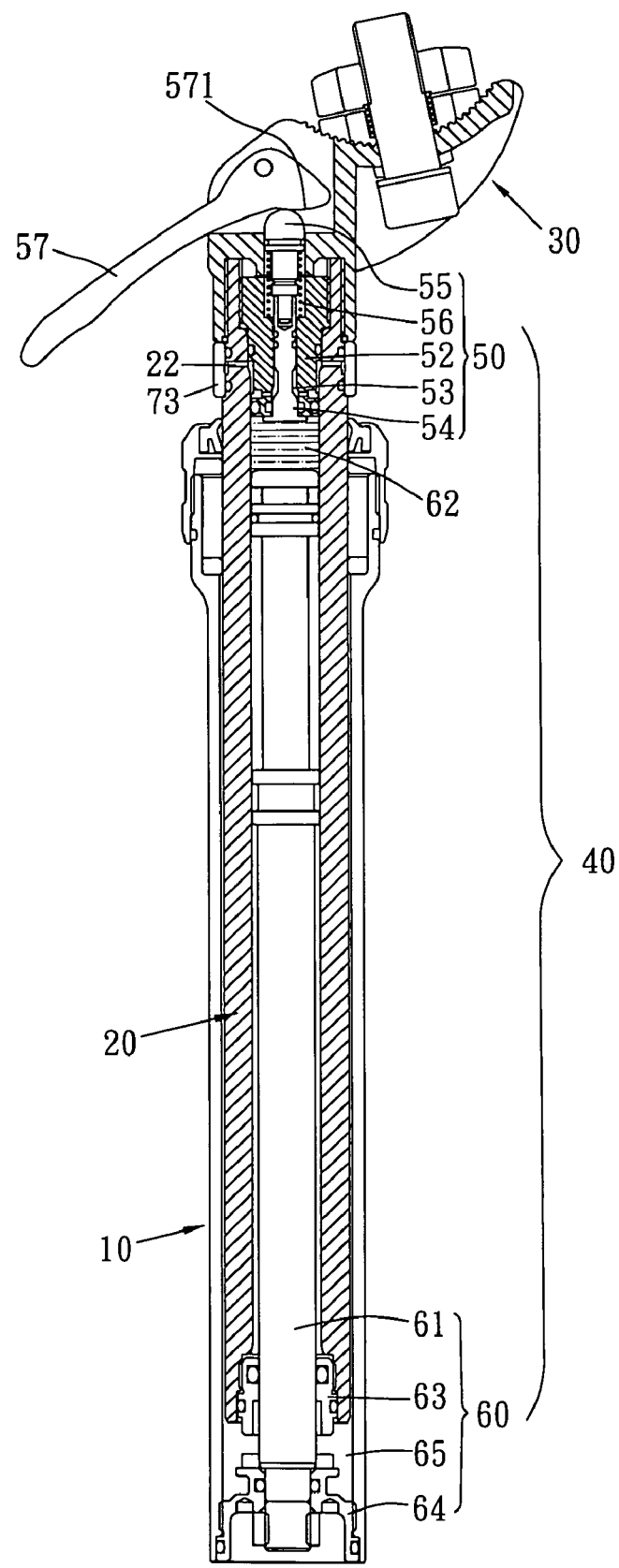
FIG. 3 is a cross sectional view of the adjustment device of the present invention.
Figure 4:
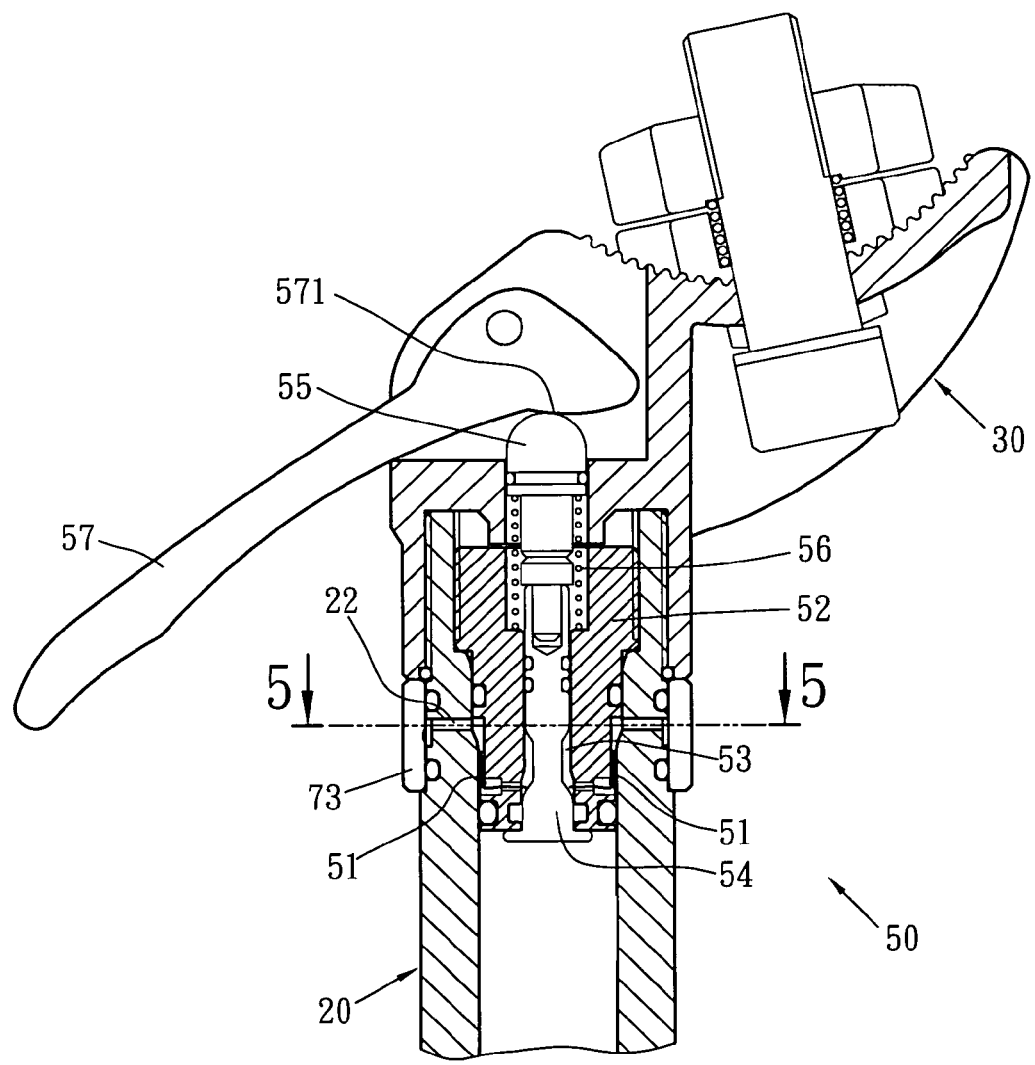
FIG. 4 is an enlarged cross sectional view to show the adjustment device of the present invention.
Figure 5:
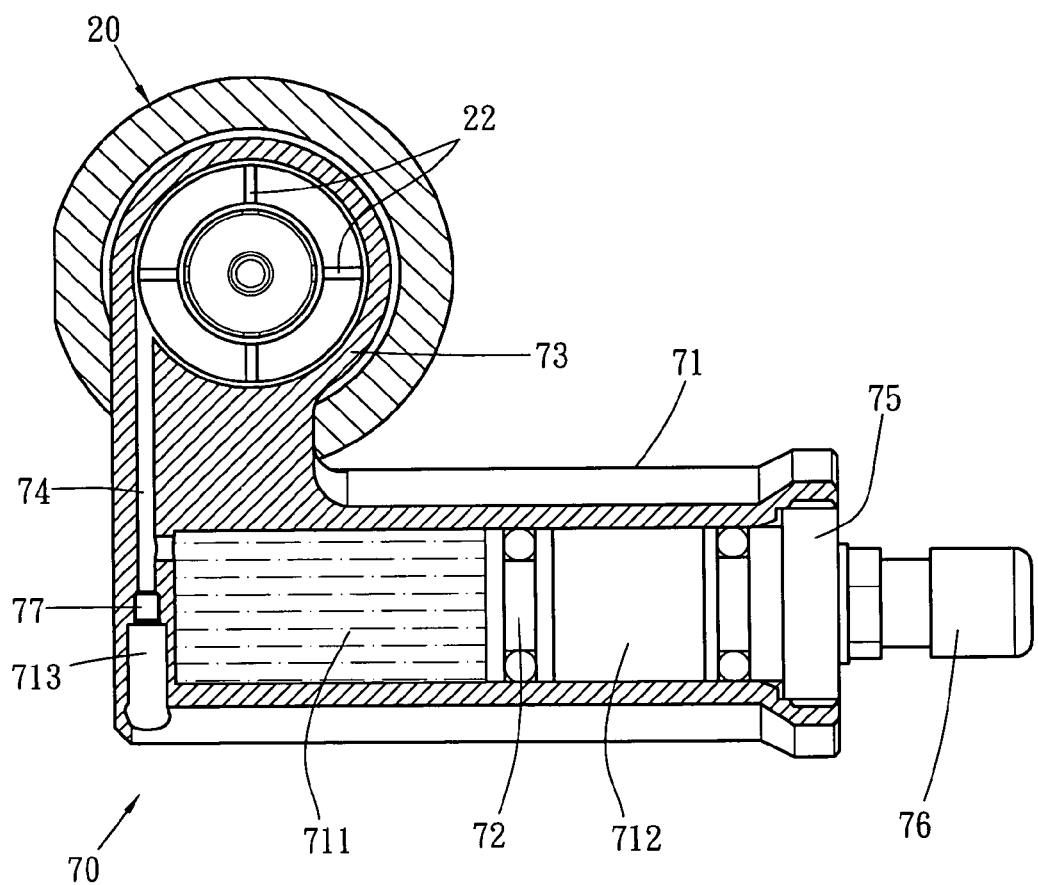
FIG. 5 is a cross sectional view taken from line 5-5 in FIG. 4.
Figure 6:
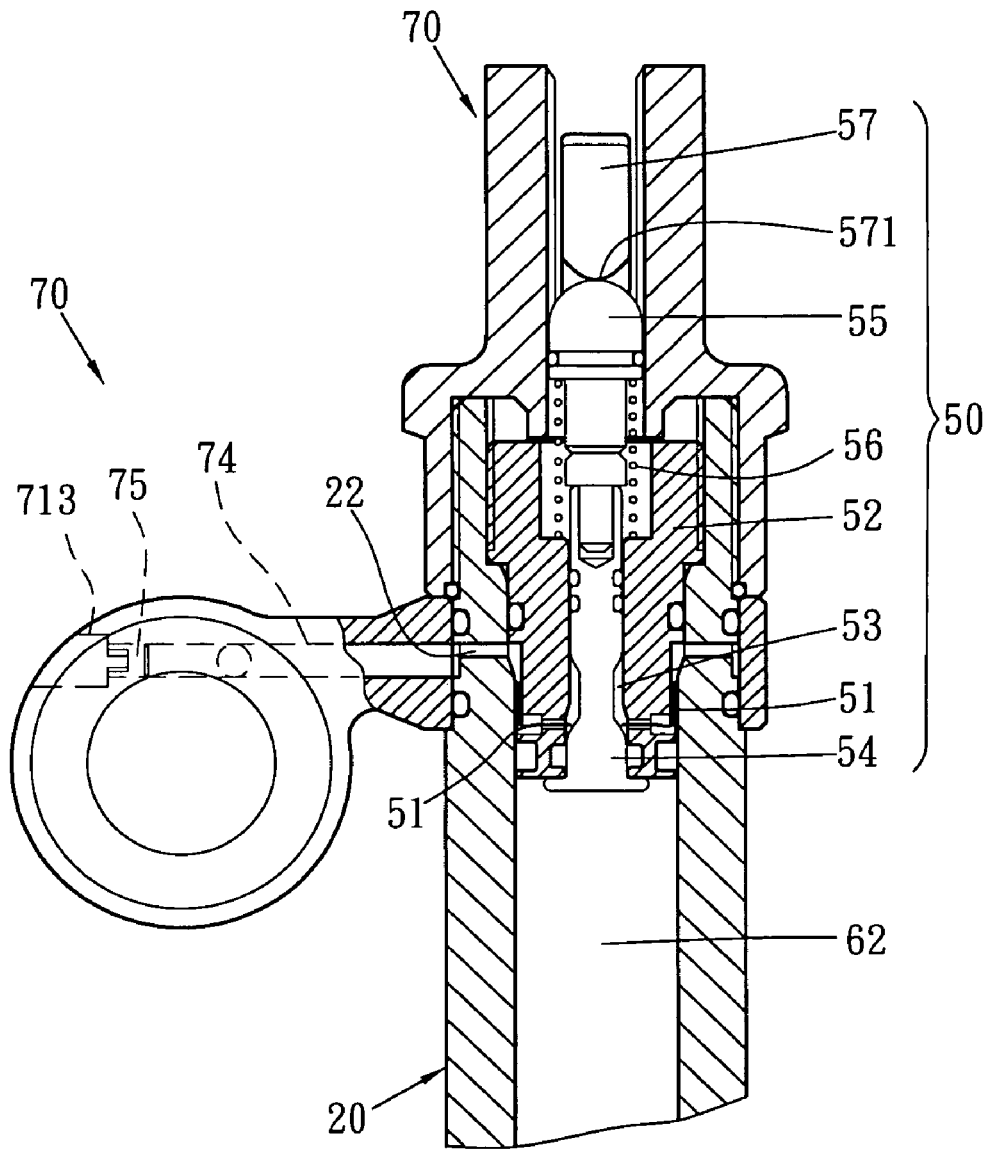
FIG. 6 is a cross sectional view to show the balance unit connected to the seat post of the adjustment device of the present invention.
Figure 7:
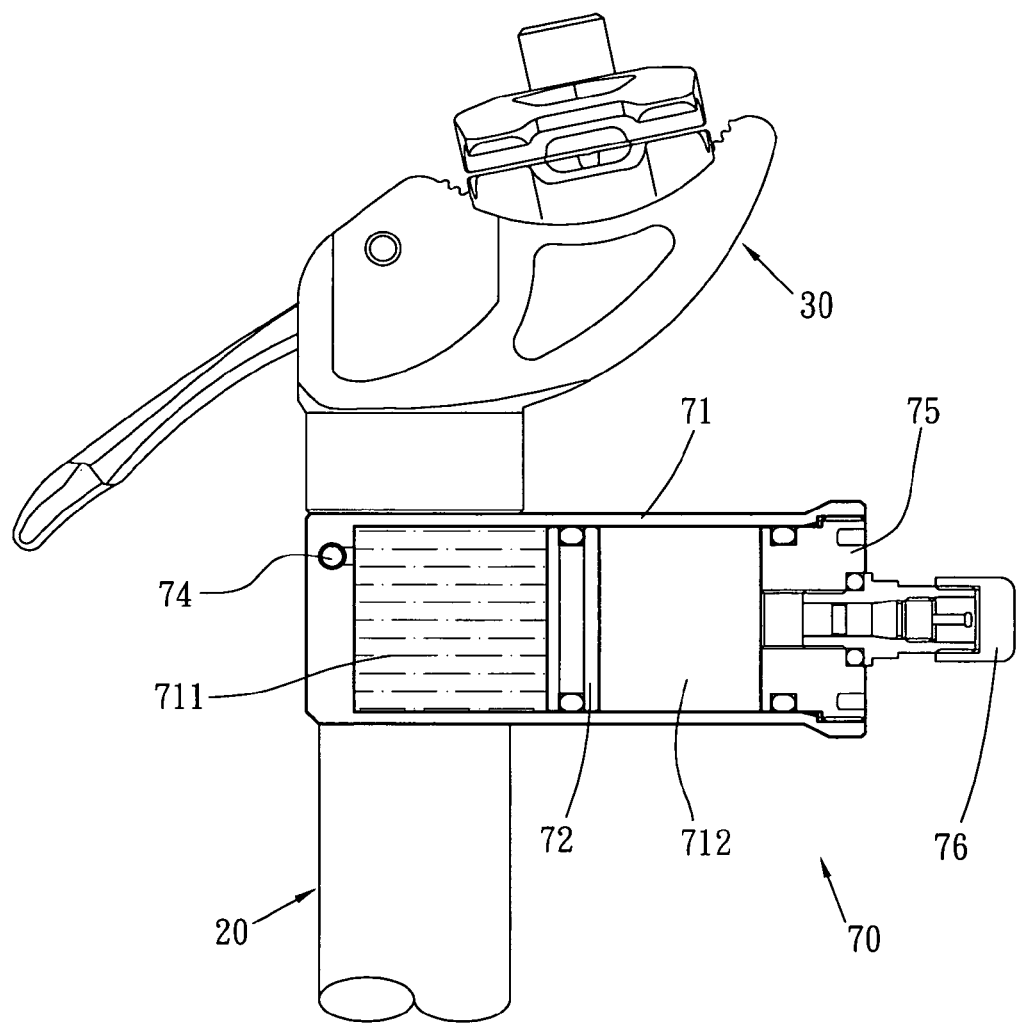
FIG. 7 shows that the balance unit includes a liquid space and an air space, a air valve is connected to the cylinder of the balance unit.
Figure 8:
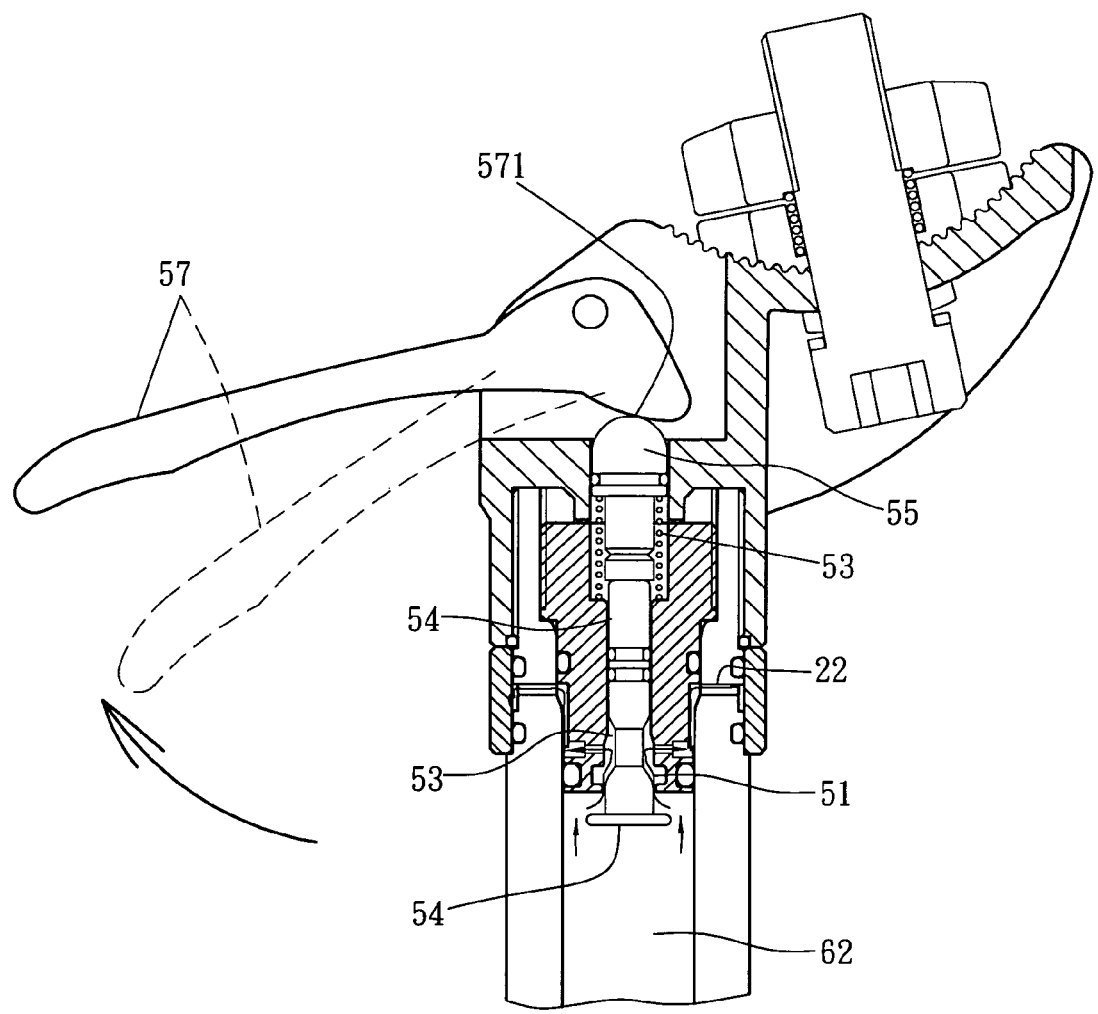
FIG. 8 is a cross sectional view to show that the liver is pivoted upward to push the valve rod downward.

Referring to FIGS. 1 to 7, the adjustable bicycle seat includes a seat tube 10 and a seat post 20 which has a lower end movably inserted into the seat tube 10 and a seat connector 30 is connected to a top of the seat post 20 so as to be connected with a bicycle seat which is not shown. The seat post 20 includes a connection portion 21 located close to a top of the seat post 20 and the connection portion 21 includes stepped outer surface and four through holes 22 are defined through the wall of the connection portion 21 and located at the narrowest portion of the stepped outer surface, An adjustment device 40 includes a control unit 50 and an adjustment unit 60. The control unit 50 is located between the seat connector 30 and the seat post 20 so as to control movement between the seat post 20 relative to the seat tube 10. The control unit 50 includes an adjustment path 51 which is controlled to be in communication with the through holes 22 or to be isolated from the through holes 22. The control unit 50 further includes an adjustment member 52 which is connected to the top of the seat post 20 and a central passage 53 is defined centrally through the adjustment member 52. The adjustment path 51 is defined between the adjustment member 52 and the central passage 53 so as to communicate with the at least one through hole 22 and the liquid room 62 which will be described later. A cap 55 is movably inserted in the seat connector 30 and located above a valve rod 54 which movably extends through the central passage 53 from the lower end of the adjustment member 52 and controls communication of the adjustment path 51. A spring 56 is located between the adjustment member 52 and the cap 55 so as to provide an upward force to the cap 55. A lever 57 is pivotably connected to the seat connector 30 and has a push end 571 which contacts the top of the cap 55.

The adjustment unit 60 includes a guide rod 61 which is inserted into the seat post 20 and a lower end of the guide rod 61 is fixed to the seat tube 10. The liquid room 62 is defined between a top end of the guide rod 61 and the seat post 20. A collar 63 is located in the lower end of the seat post 20 and the guide rod 61 extends through the collar 63. A positioning member 64 is connected in the lower end of the seat tube 10 and a lower end of the guide rod 61 is fixed to the positioning member 64. An air room 65 is defined between the collar 63, the positioning member 64 and an inner periphery of the seat tube 10.

A balance unit 70 is connected to the connection portion 21 and includes a cylinder 71 and a piston ring 72 is movably received in the cylinder 71. The piston ring 72 defines an inner space of the cylinder 71 into a liquid space 711 and an air space 712. The balance unit 70 includes a mounting ring 73 which is integral to the cylinder and mounted to the connection portion 21. The cylinder 71 includes a supply path 74 which communicates with the liquid space 711, the inner periphery of the mounting ring 73 and the through holes 22. A seal member 75 is used to seal the air space 712 and an air valve 76 is connected to the seal member 75 so that air is introduced into the air space 712. An inlet 713 is defined through a wall of the cylinder 71 and communicates with the liquid space 711 so that hydraulic fluid can be supplied to the fluid room via the inlet 713. A seal piece 77 seals the inlet 713.

The hydraulic fluid is supplied via the inlet 713 and fills the liquid room 62, the adjustment path 51, the central passage 53, the through holes 22, the supply path 74 and the liquid space 711 when the adjustment path 51 is not sealed. The adjustment path 51 communicates all of the paths and passages of the adjustment device, such as the liquid room 62, the adjustment path 51, the central passage 53, the through holes 22, the supply path 74 and the liquid space 711.

As shown in FIGS. 8 to 12, when pivoting the lever 57 upward, the push end 571 pushes the cap 55 downward and the valve rod 54 is lowered so that the lower end of the valve rod 54 does not seal the adjustment member 52, the hydraulic in the liquid room 62 flows to the central passage 53 and the through holes 22, this means that the adjustment path 51 is in an opened status so that the seat post 20 can be moved relative to the seat tube 10.

Figure 9:
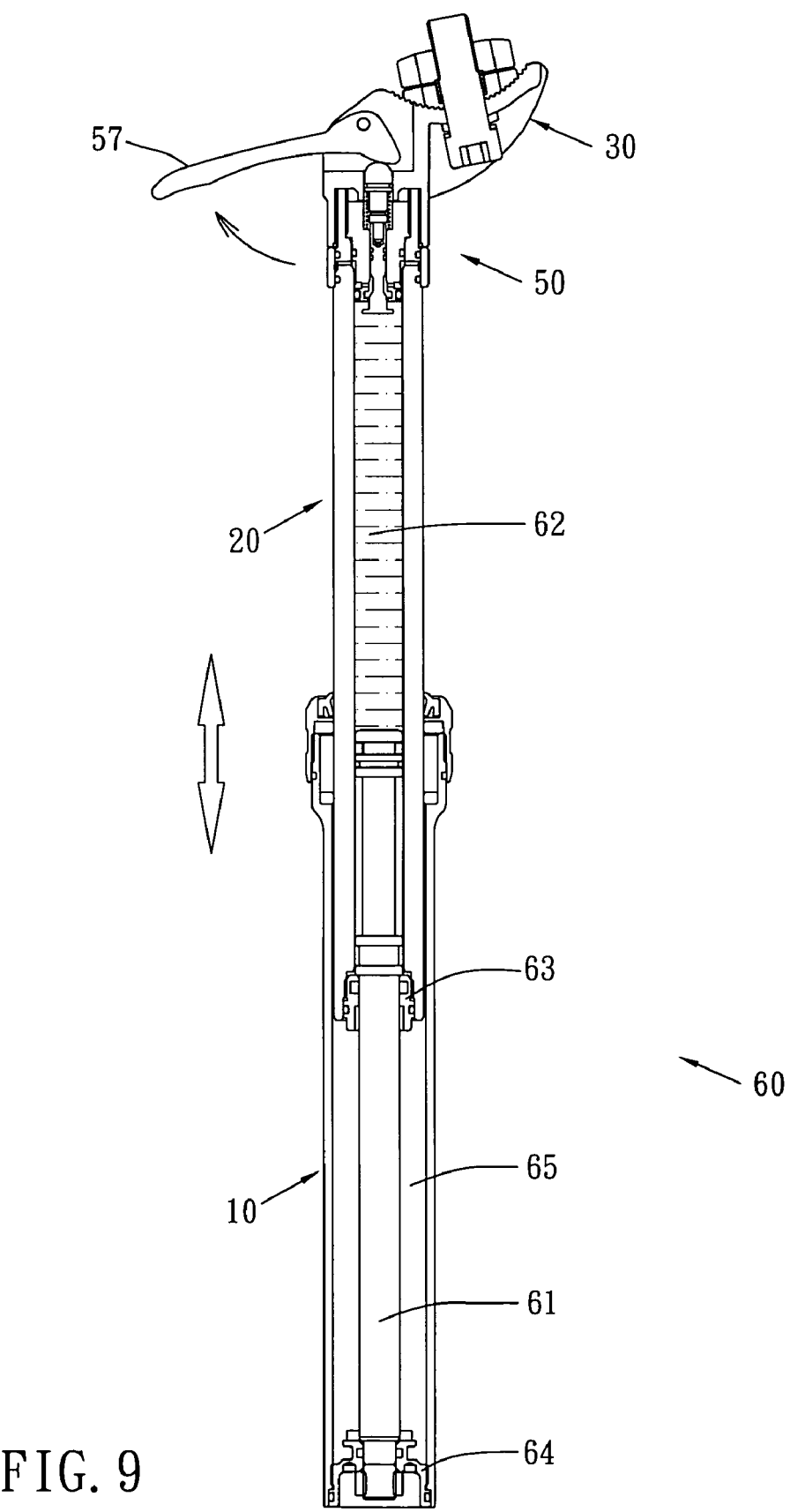
FIG. 9 shows that the seat post is movable relative to the seat tube.
Figure 10:
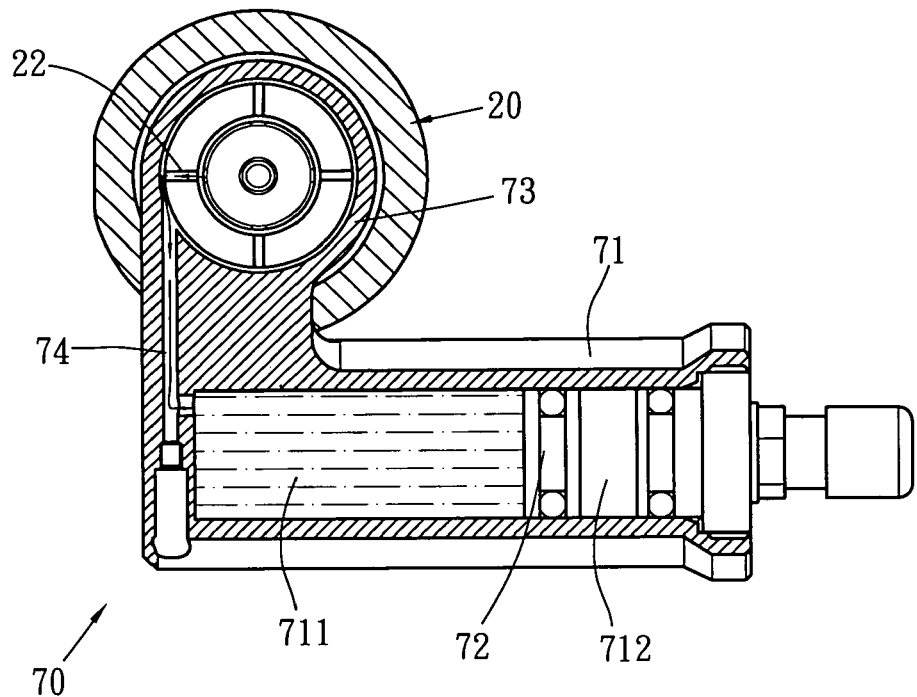
FIG. 10 is a cross sectional view to show the movement of the hydraulic fluid when the liver is pivoted upward to push the seat post downward.
Figure 11:
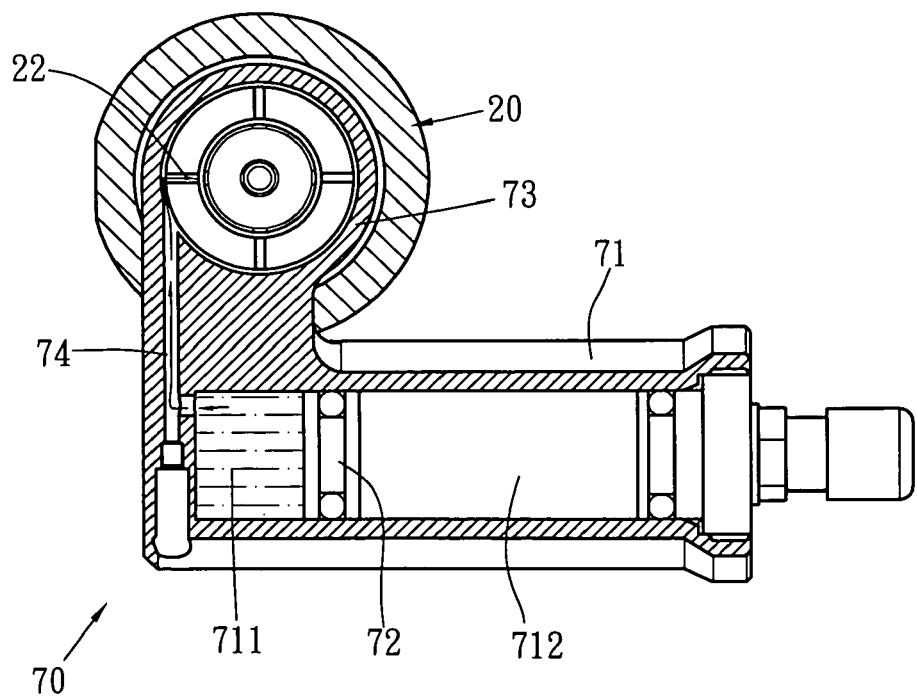
FIG. 11 is a top cross sectional view to show that the piston ring is moved to increase the air space.
Figure 12:
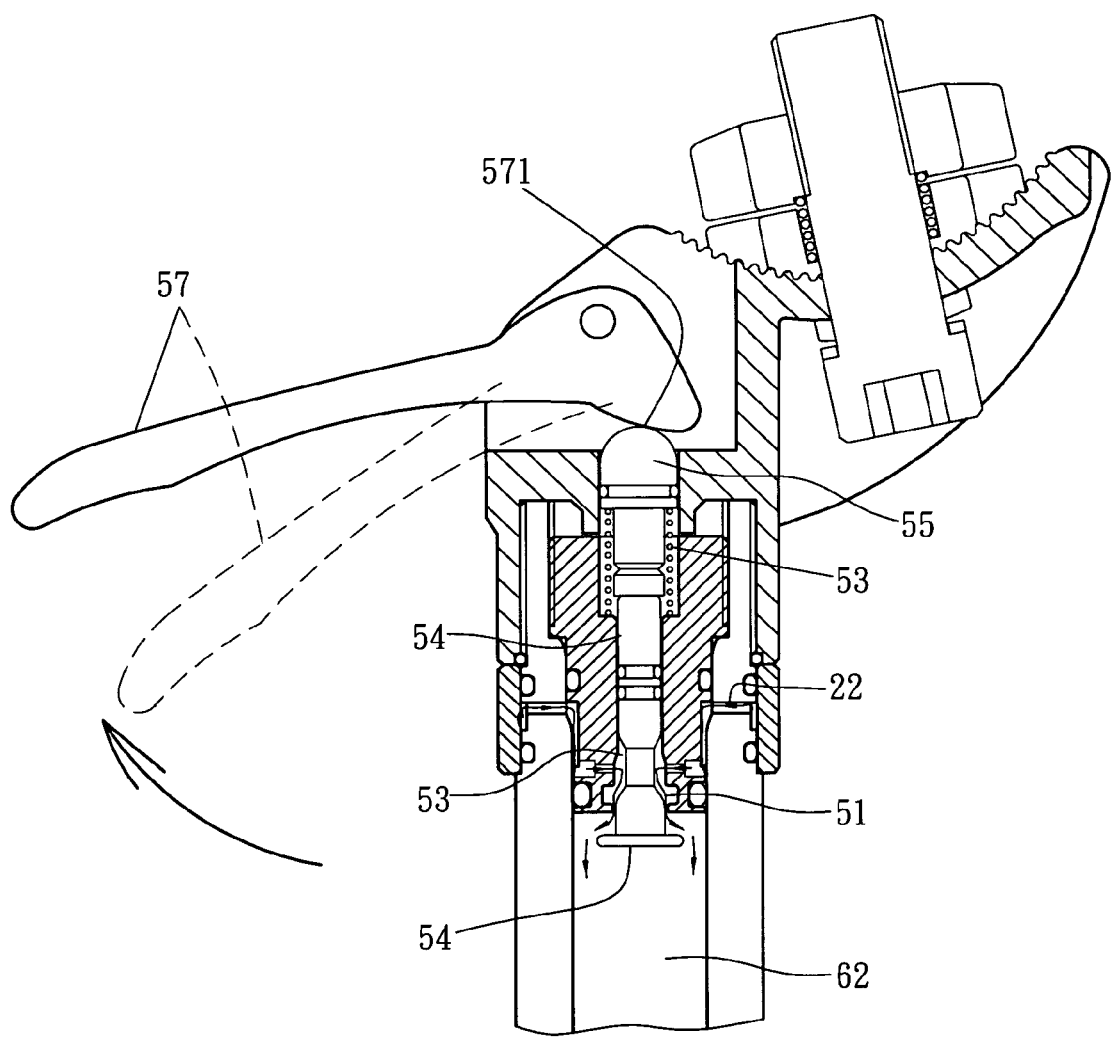
FIG. 12 is a cross sectional view to show the movement of the hydraulic fluid when the liver is pivoted upward to pull the seat post upward

When the seat post 20 is adjusted to a lower position, the hydraulic fluid in the liquid room 62 flows into the liquid space 711 in the cylinder 71 via the adjustment path 51. The piston ring 72 moves toward the air space 712 to compress the air space 712 as shown FIGS. 9 and 10. As shown in FIGS. 9 and 11, when adjusting the seat at a higher position, the pressure in the air space 712 in the cylinder 71 of the balance unit 70 pushes the piston ring 72 toward the liquid space 711 so that the hydraulic liquid in the liquid space 711 is supplied to the liquid room 62 via the adjustment path 51. The piston ring 72 moves to a position where the pressures on two sides of the piston ring 72 obtain a new balance.

Figure 13:
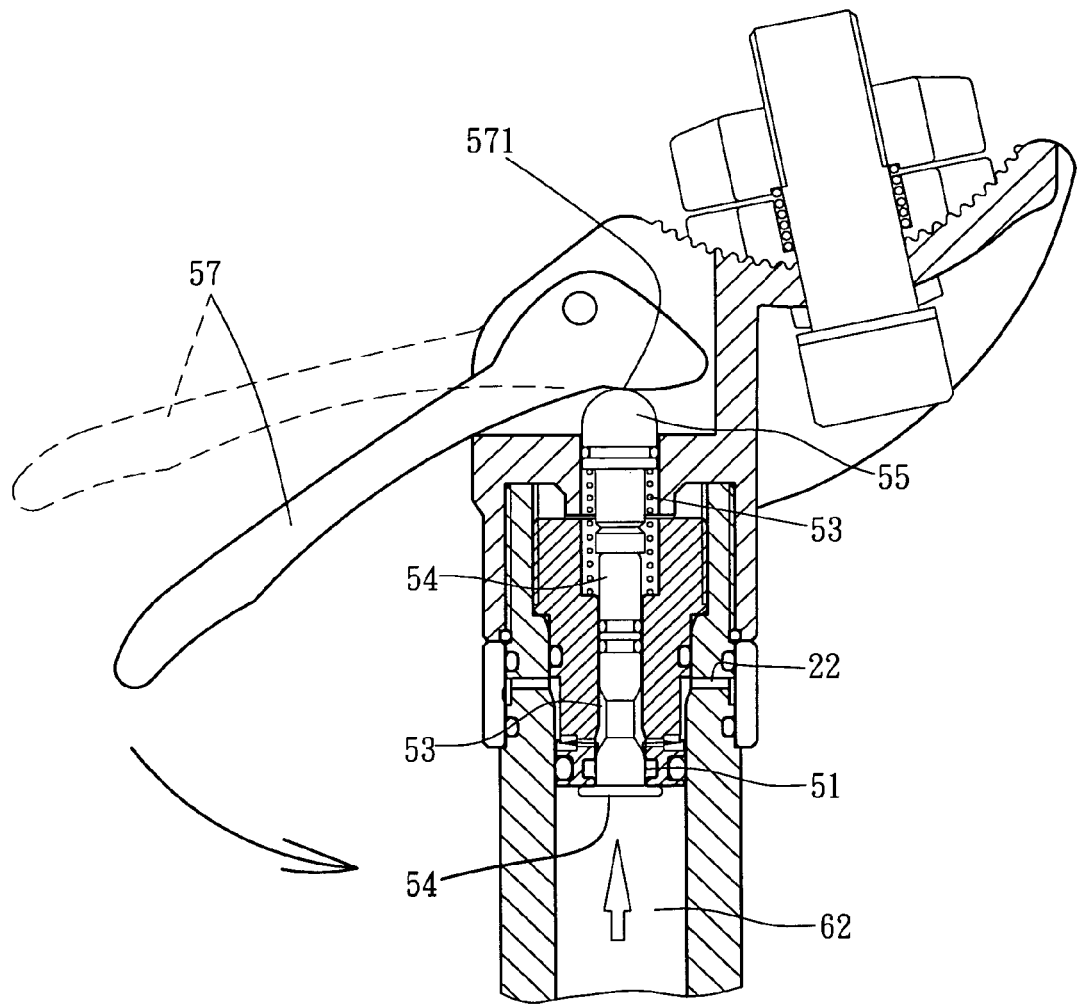
FIG. 13 is a top cross sectional view to show that the cap is pushed by the spring when the lever is pivoted downward.
Figure 14:
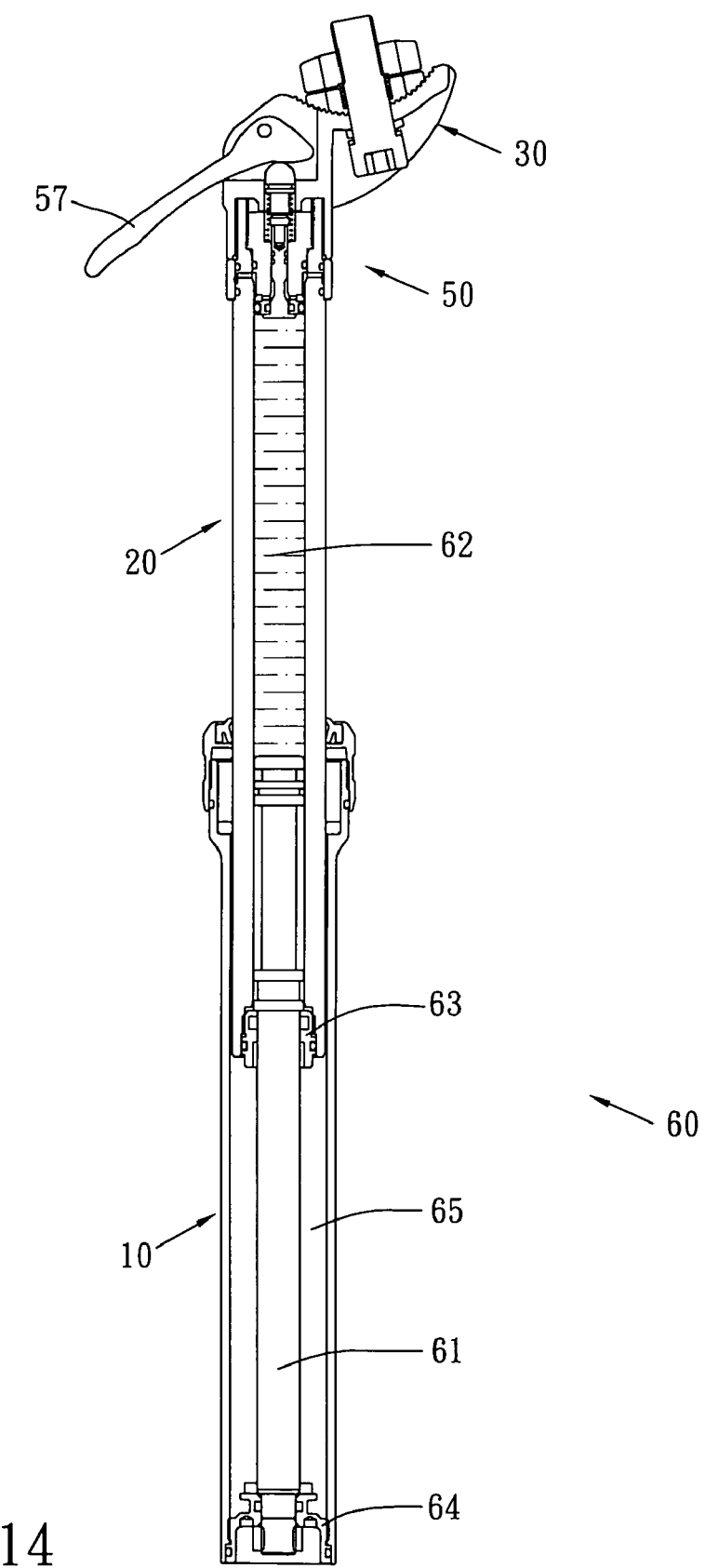
FIG. 14 shows that the seat post is set at a high position.
Figure 15:
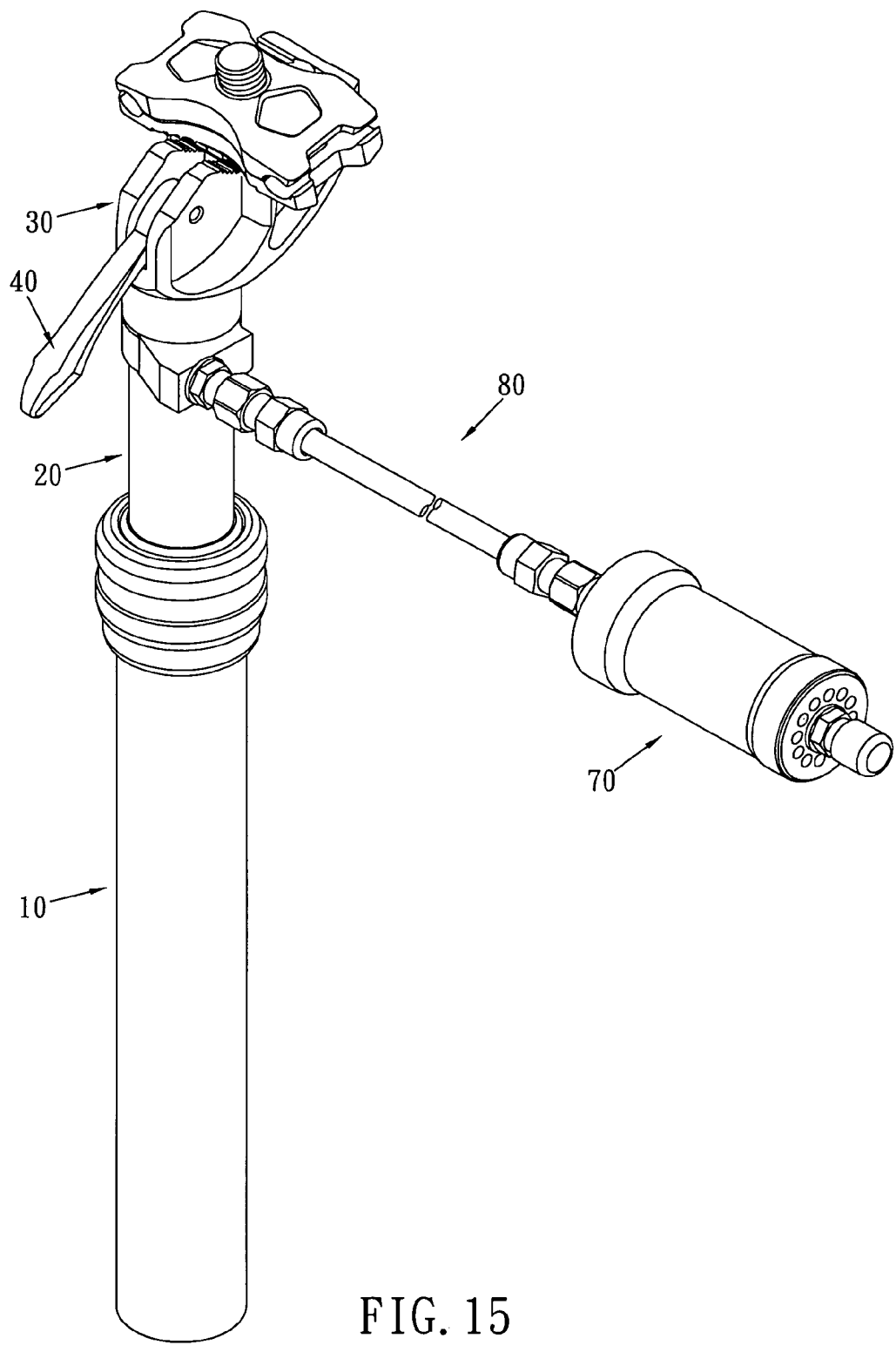
FIG. 15 shows another embodiment of the connection of the balance unit.
Figure 16:
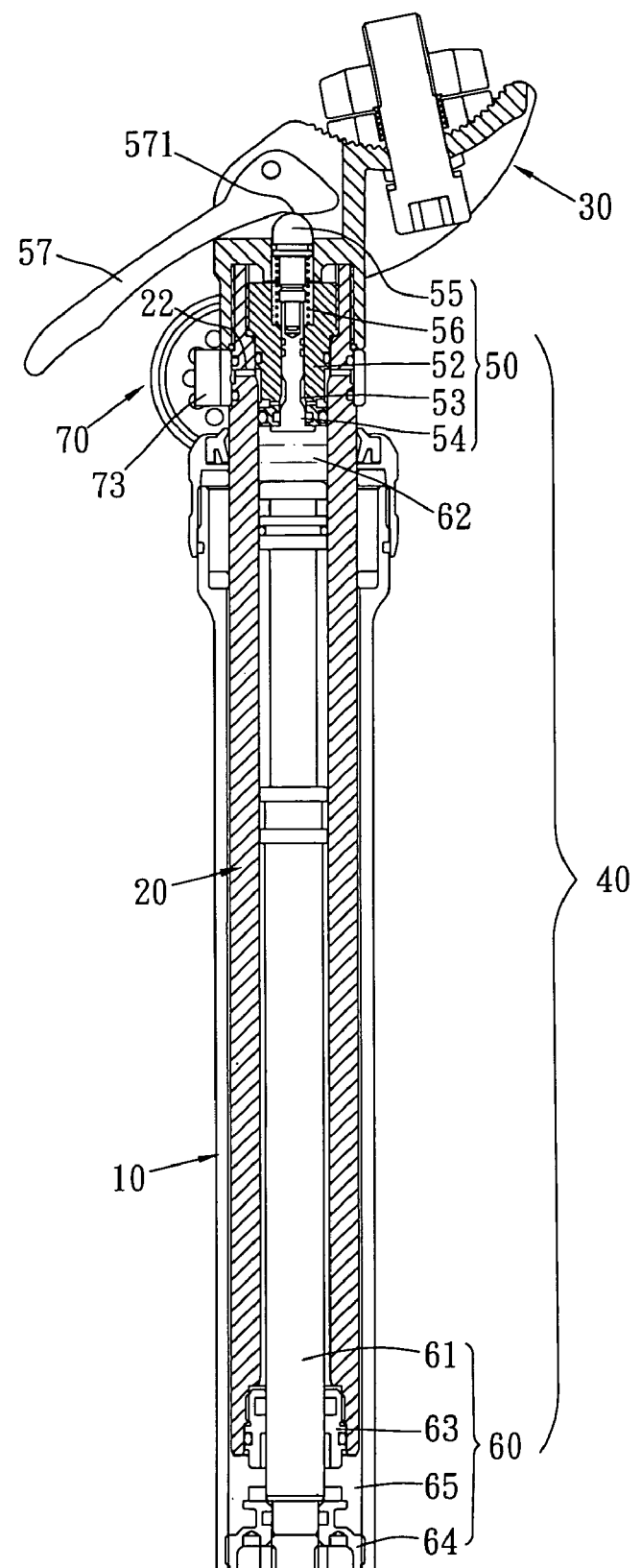
FIG. 16 is a cross sectional view to show the balance unit in FIG. 15 is connected to the adjustment device of the present invention.

As shown in FIGS. 13 and 14, when the seat is adjusted to a desired position, the lever 57 is released and the spring 56 pushes the cap 55 upward and pivots the lever 57 downward. On the other hand, the pressure in the liquid room 62 pushes the valve rod 54 upward to seal the adjustment member 52 so that the adjustment path 51 is closed and the seat is set at the position.

The balance unit 70 is connected exteriorly to the seat post 20 and provides sufficient hydraulic fluid to the seat post 20 so that the seat tube 10 and the seat post 20 do not need to change. The volume of the cylinder 71 of the balance unit 70 can be adjusted to meet the need of the travel distance of the seat post 20. The bicycle frame does not need to make any amendment and only the balance unit 70 should be changed. The seat can be adjusted to any desired position.

It is noted that the pressure of air in the air space 712 can be adjusted via the air valve 76 and the volume of the hydraulic fluid can be adjusted via the inlet 713. The guide rod 61 is located within the seat post 20 so that the seat post 20 can move along the guide rod 61 without worry of shaking.

FIGS. 15 to 18 show another embodiment, wherein the connection portion 21 includes a protrusion and the through holes 22 are defined through the protrusion. A tube unit 80 is connected between the connection portion 21 and the balance unit 70 so as to communicate the at least one through hole 22 and the supply path 74. The tube unit 80 includes two connection members 81 with a tube 82 connected therebetween, the two connection members 81 are respectively connected to the through holes 22 and the supply path 74.

Figure 17:
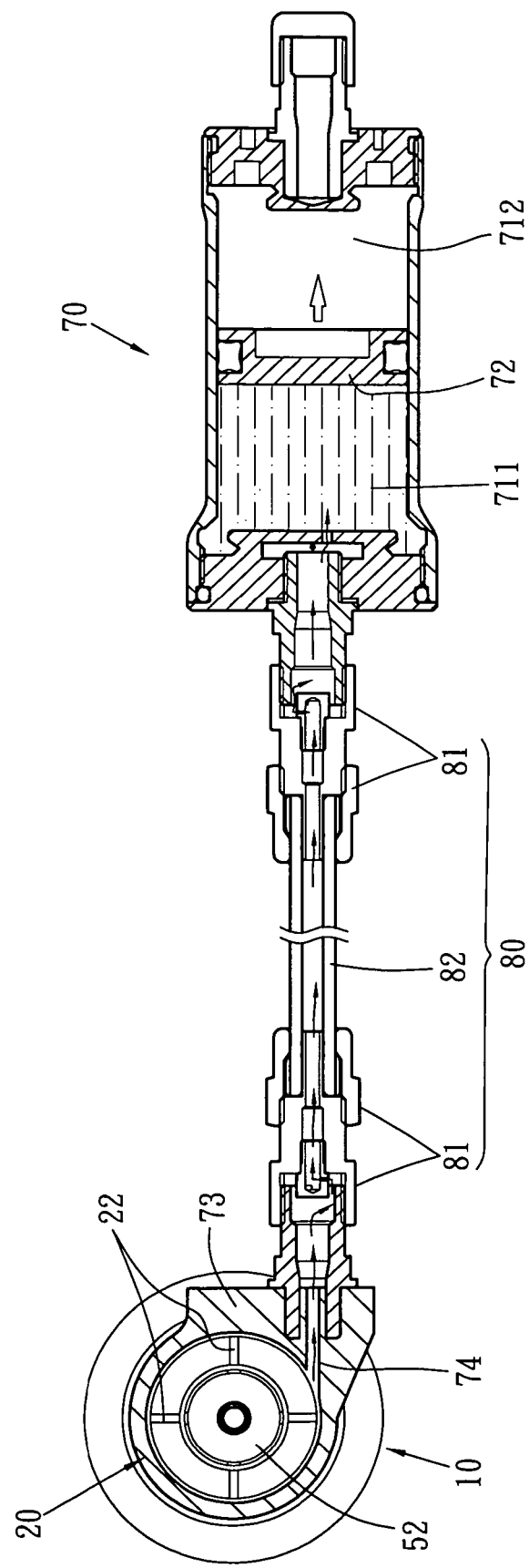
FIG. 17 is a cross sectional view to show the tube unit connected between the balance unit and the seat post, wherein the piston ring is moved to increase the liquid space.
Figure 18:
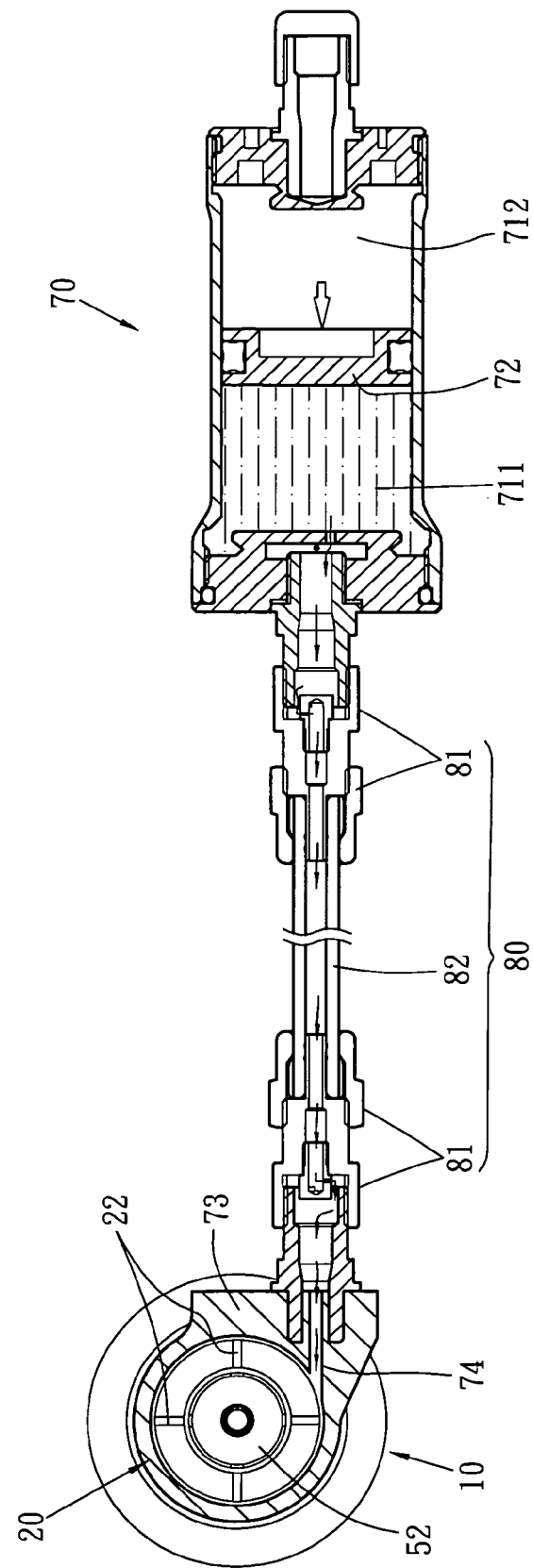
FIG. 18 is a cross sectional view to show the tube unit connected between the balance unit and the seat post, wherein the piston ring is moved to increase the air space.

The balance unit 70 can be installed on any desired portion of the bicycle frame and is connected the adjustment device 40 by the tube unit 80. As shown in FIG. 17, when the seat post 20 is adjusted to a lower position, the hydraulic fluid flows through the through holes 22, the supply path 74, the connection member 81, the tube 82, the other connection member 81 and enters into the liquid space 711. When the seat post 20 is adjusted to a higher position, as shown in FIG. 18, the hydraulic fluid flows from the liquid space 711, the connection member 81, the tube 82, the other the connection member 81, the supply path 74, through the through holes 22, and enters into the liquid room 62.

The adjustment device of the present invention can be applied to most of the conventional bicycles without too much change in their structure. The seat tube 10 and the seat post 20 can be maintained the same, and the operation is easy. The seat can be adjusted to any desired position.

While we have shown and described the embodiment in accordance with the present invention, it should be clear to those skilled in the art that further embodiments may be made without departing from the scope of the present invention.

What is claimed is:

1. An adjustment device for bicycle seat, comprising:
   a seat tube;
   a seat post having a connection portion located close to a top of the seat post and a lower end of the seat post movably inserted into the seat tube, at least one through hole defined through a wall of the connection portion;
   a seat connector connected to the top of the seat post and adapted to be connected with a seat;
   an adjustment device located between the seat connector and the seat post so as to control movement between the seat post relative to the seat tube, the adjustment device including an adjustment path which is controlled to be in communication with the at least one through hole or to be isolated from the at least one through hole, and
   a balance unit connected to the connection portion and including a cylinder and a piston ring movably received in the cylinder, the piston ring defining an inner space of the cylinder into a liquid space and an air space, the cylinder including a supply path which communicates with the liquid space and the at least one through hole.

2. The device as claimed in claim 1, wherein the seat post includes a liquid room defined therein and an air room is defined between the seat post and an inner periphery of the seat tube, the adjustment device includes an adjustment member connected to the top of the seat post and a central passage is defined centrally through the adjustment member, the adjustment path is defined between the adjustment member and the central passage so as to communicate with the at least one through hole and the liquid room, a valve rod movably extends through the central passage and control communication of the adjustment path.

3. The device as claimed in claim 2, wherein the adjustment device includes a cap which is movably inserted in the seat connector and located above the valve rod, a spring is located between the adjustment member and the cap so as to provide an upward force to the cap, a lever is pivotably connected to the seat connector and has a push end which contacts the cap.

4. The device as claimed in claim 1, wherein the balance unit includes a mounting ring which is integral to the cylinder and mounted to the connection portion.

5. The device as claimed in claim 4, wherein the connection portion includes stepped outer surface and the at least one through hole is located at the narrowest portion of the stepped outer surface, the supply path communicates between the liquid space and an inner periphery of the mounting ring.

6. The device as claimed in claim 5, wherein the balance unit includes a seal member to seal the air space and an air valve is connected to the seal member so that air is introduced into the air space.

7. The device as claimed in claim 5, wherein an inlet is defined through a wall of the cylinder and communicates with the liquid space, a seal piece seals the inlet.

8. The device as claimed in claim 1 further comprising a tube unit which is connected between the connection portion and the balance unit so as to communicate the at least one through hole and the supply path.

9. The device as claimed in claim 8, wherein the tube unit includes two connection members with a tube connected therebetween, the two connection members are respectively connected to the at least one through hole and the supply path.

10. The device as claimed in claim 8, wherein the connection portion includes a protrusion and the at least one through hole is defined through the protrusion.

11. The device as claimed in claim 1, wherein the adjustment device includes a guide rod which is inserted into the seat post and a lower end of the guide rod is fixed to the seat tube, a liquid room is defined between a top end of the guide rod and the seat post.

12. The device as claimed in claim 11, wherein the adjustment device includes a collar which is located in a lower end of the seat post and the guide rod extends through the collar, a positioning member is connected in a lower end of the seat tube and a lower end of the guide rod is fixed to the positioning member, an air room is defined between the collar, the positioning member and an inner periphery of the seat tube.

* * * * *